United States Patent [19]

Hishitani

[11] 3,941,241

[45] Mar. 2, 1976

[54] DEVICE FOR CLEANING MOVING BALUSTRADE BELT

[76] Inventor: Kinue Hishitani, No. 5-10, Irie, Aza Shimono-Ike, Nishimo, Itami, Hyogo, Japan

[22] Filed: Apr. 2, 1974

[21] Appl. No.: 457,342

[52] U.S. Cl. .............................. 198/230; 198/16 R

[51] Int. Cl.² .......................................... B65G 45/00

[58] Field of Search ......... 198/16 R, 16 MS, 17, 18, 198/229, 230

[56] References Cited

UNITED STATES PATENTS

| | | | |
|---|---|---|---|
| 2,550,918 | 5/1951 | Felix et al. | 198/16 R |
| 2,846,045 | 8/1958 | Fowler | 198/16 R |

FOREIGN PATENTS OR APPLICATIONS

| | | | |
|---|---|---|---|
| 765,866 | 1/1957 | United Kingdom | 198/230 |

*Primary Examiner*—Evon C. Blunk
*Assistant Examiner*—Joseph E. Valenza
*Attorney, Agent, or Firm*—Wenderoth, Lind & Ponack

[57] ABSTRACT

A device for cleaning the balustrade belt of an escalator. The device has two opposed compartments connected to each other and is detachably but firmly fitted to the balustrade so as to rub the moving belt by means of a connector furnished on the escalator. The device has an inward pressing spring therein to cause a wiper placed between the device and the belt to be in pressing contact with the outer surface of the belt, the wiper being firmly held inside the device proper in a notched surface formed between two protrusions thereof.

3 Claims, 5 Drawing Figures

DEVICE FOR CLEANING MOVING BALUSTRADE BELT

The present invention relates to a device for cleaning the balustrade belt of escalator and the like, said device having a wiper therein being detachably and elastically fitted to the guiderail of said balustrade belt so as to keep the wiper in close contact with the belt on its outer surface thereby wiping the belt as the belt moves.

It has been an earnest desire in the circles concerned to equip escalators and the like with a cleaning device for preventing the belt from being soiled by hands of riders and also a device able to prevent finger-trapping accidents as is often the case with little children.

A main object of the present invention is to provide a device able to meet such demands as above-mentioned, said device being comprised of two compartments connected by hinges so as to be separable from each other at need, said device further being detachably and elastically fitted onto the balustrade belt of an escalator and the like.

The object can be accomplished by the improvement, combination and operation of every part constituting the present invention, the preferred embodiment of which will be illustrated with the annexed drawings as below.

Figure 1:
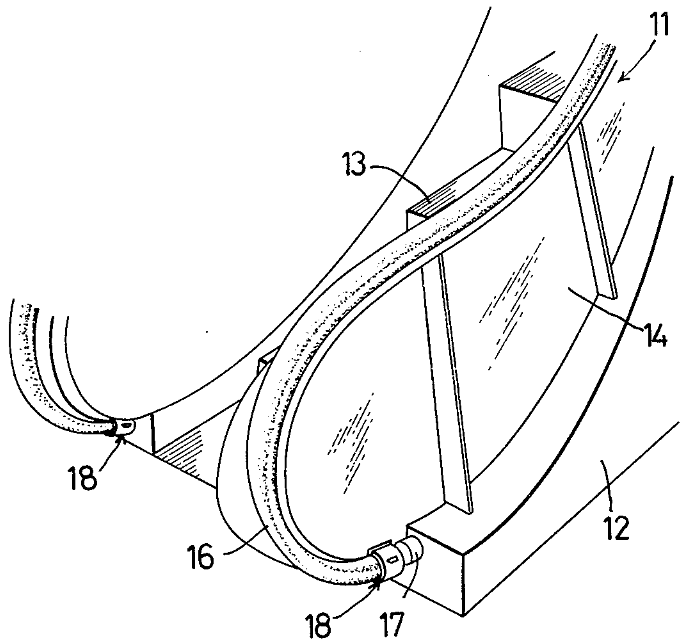
FIG. 1 is a perspective view of the device in the present invention in a state of actual usage.
Figure 5:
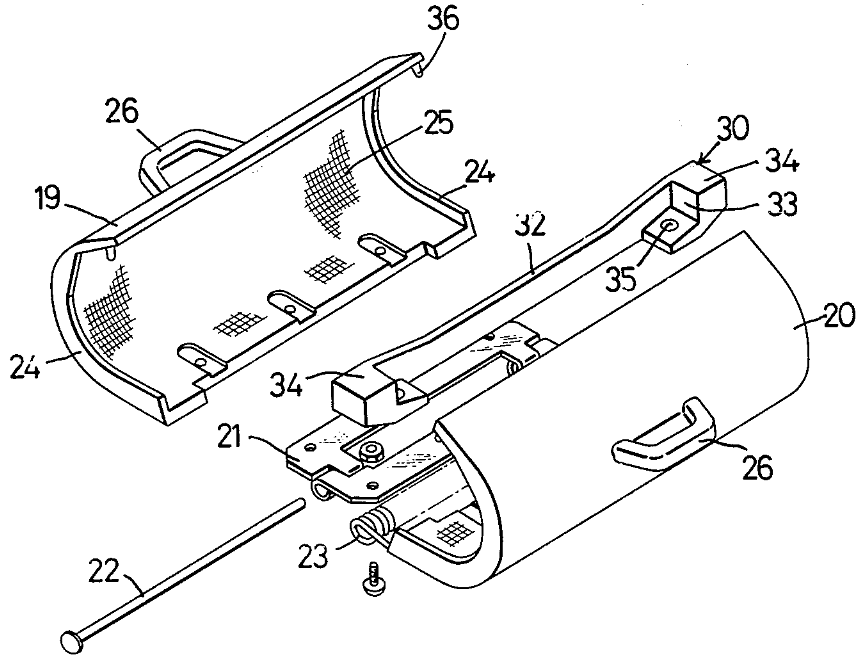
FIG. 5 is a perspective view of main parts of said device in an exploded state.
Figure 2:
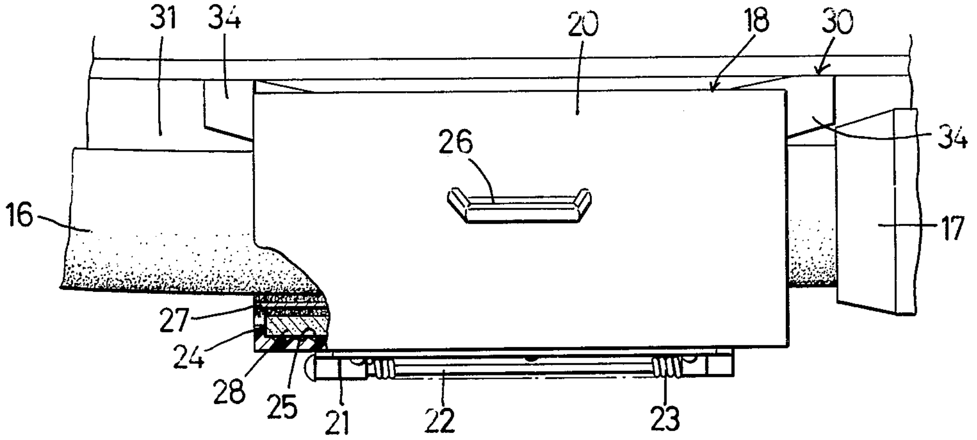
FIG. 2 is a magnified view of the main parts of the above.
Figure 4:
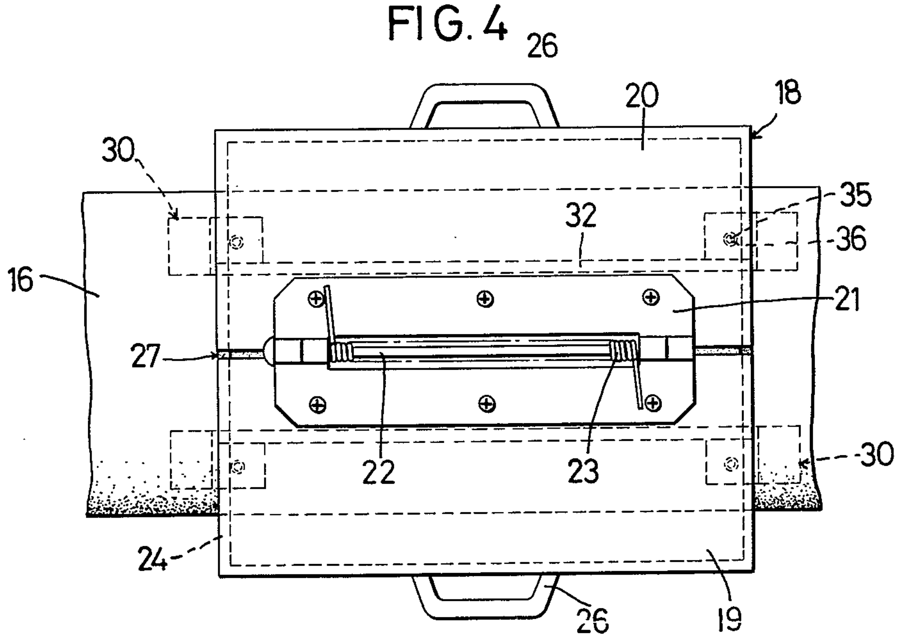
FIG. 4 is a view of said device showing its bottom.
Figure 3:
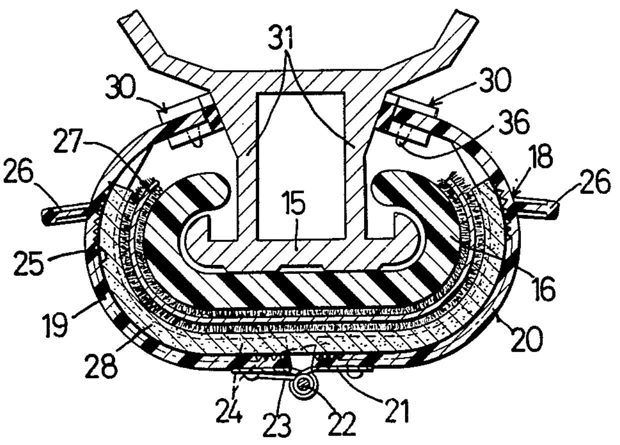
FIG. 3 is a longitudinal side view of said device.

In the embodiment shown in FIG. 1 – 5, an escalator 11 steps 13 above a machine chamber 12, side walls 14 at both sides of said steps 13 with a guiderail 15 at the outer periphery thereof. On said guiderail 15 is a balustrade belt 16 placed so as to move at the same speed as the steps 13, said balustrade belt 16 passing through said machine chamber 12 where at both ends thereof an inlet 17 is projects therefrom, as is the case with the usual escalator and the like.

The cleaning device 18 is detachably fitted over the balustrade belt 16 immediately outside the inlet 17 in which said belt is entering.

The cleaning device 18 made of hard synthetic resin and the like comprises two compartments 19 and 20 bending inward so as to fit the shape of the balustrade, said compartments 19 and 20 being connected by hinges 21 and axis 22 so as to be positioned at the connected part below said balustrade. Said compartments 19 and 20 are provided with a spring 23 so as to bias the compartments 19 and 20 constantly inward.

Said compartments 19 and 20 are formed so as to leave a minute space between them and the outer surface of the balustrade belt 16 as they fit together so that a wiper 27 can be fitted into said space. Said compartments 19 and 20 each have at both longitudinal ends thereof an inward-protrusion 24, said compartments 19 and 20 are notched all over the inside surface thereof, and a grip 26 is provided on each of the compartments 19 and 20 at the outside periphery thereof. Said wiper 27 is made of thick cloth, sponge and the like and shaped suitably for pressing over the balustrade belt 16 at the outer surface thereof.

Disinfectant, silicon and the like are usually contained in said wiper 27 to add to the sanitation and to improve the effect of this cleaning device.

Said wiper 27 is provided with a layer 28 of felt and the like, attached by suitable means such as sewing and the like. Said layer 28 plays the role of fitting the wiper 27 just inside the device proper 18, i.e. the compartments 19 and 20 in the combined state, in between said protrusions 24.

A connector 30 fixes the device 18 to the escalator 11 at the guidrail 15 thereof, said connector 30 being attached firmly to the guiderail 15 at the outer surface of side walls at the base portion thereof by means of welding and the like.

Said connector 30, made of hard rubber and the like, comprises a body 32 having at both ends thereof a projecting part 34 which forms a recess 33 for receiving the compartments 19 and 20 at one of the corners thereof. Each recess 33 has at the bottom thereof a small hole 35 into which is inserted an inward-projection 36 provided at the compartments 19 and 20 one of the terminals of, said insertion of the projection 36 into the small hole 35 and the fitting of the compartments 19 and 20 at one of edges thereof into said recess 33 plays the role of keeping the device 18 firmly stationary around the balustrade belt 16.

Description further in detail of the above-referred embodiment follows:

The two compartments 19 and 20 connected by hinges 24 at one side are opened by pulling the grip 26 against the inward pressing of the spring 23 with the wiper 27 attached with a layer 28 fitted to the compartments 19 and 20 at the inside peripheries thereof. The compartments 19 and 20 fit onto the balustrade belt 16 at a spot immediately outside the inlet 17 into which the belt 16 is entering. Then the compartments 19 and 20 are fixed to the connector 30 furnished on said side wall 31 at the base portion of the guiderail 15 inserting the inward-projection 36 into the small hole 35 and fixing said terminals at the corners thereof into said recess 33. Said wiper 27 inside said compartments is pressed against the balustrade belt 16 at the outer surface thereof by means of the inward-springing pressure of spring 23 incorporated therewith, thereby giving efficiency to the wiping of the belt 16 as it moves.

The wiper 27 when worn out can be replaced with new one by means of removing it from the connector 30 after opening and removing the compartments 19 and 20 from the balustrade belt 16.

What is claimed is:

1. An apparatus for cleaning the moving handrail supported by the sidewalls of an escalator and the like, said apparatus comprising:

wiping means in contact with said moving handrail for cleaning said handrail;

compartment means surrounding and spaced from said moving handrail and removably secured to said escalator sidewall for holding said wiping means in contact with said moving handrail, said compartment means having open ends for allowing said moving handrail to pass therethrough, and said compartment means comprised of:

two encasing halves surrounding said moving handrail;

spring hinge means for hinging said two encasing halves together and biasing both of said halves inward toward said handrail, rims along the edges of each encasing half for containing said wiping means within said compartment means, projections on the inside edges of each half opposite said hinge means for engaging with and removably securing said compartment means to said fastening means, and two handles, one on each encasing half, to facilitate the positioning of said compartment means around said handrail and to facilitate the removal of said compartment means from around said handrail; and fastening means attached to said escalator sidewall for receiving and securing said compartment means surrounding said handrail to said escalator sidewall, whereby said compartment means can be attached around and removed from around said handrail.

2. A cleaning apparatus as claimed in claim 1 wherein said wiping means is comprised of a solvent-treated cleaning-material layer positioned for contact with said handrail; and a backing material layer attached to said cleaning-material layer removably fitted within the inside rims of said compartment means.

3. A cleaning apparatus as claimed in claim 1 wherein said fastening means is comprised of two fastening bars, a first fastening bar attached to the sidewall of said escalator on one side of said moving handrail and a second fastening bar attached to said sidewall on the other side of said handrail, said fastening bars having holes therein to receive the projections on the inside edges of said encasing halves, whereby said compartment means is removably fitted around said moving handrail by engaging the projections on the inside of the encasing halves in the holes in said fastening bars.

* * * * *